(12) United States Patent
Sterling et al.

(10) Patent No.: US 11,137,756 B2
(45) Date of Patent: Oct. 5, 2021

(54) UNMANNED AERIAL VEHICLE (UAV) LANDING SYSTEMS AND METHODS

(71) Applicant: THE BOEING COMPANY, Chicago, IL (US)

(72) Inventors: Millie Irene Sterling, Darmstadt (DE); Matthew B. Hendrian, Aurora, CO (US); Cash Neil Johnson, Boulder, CO (US); Jeremy Richards, Aurora, CO (US)

(73) Assignee: THE BOEING COMPANY, Chicago, IL (US)

( * ) Notice: Subject to any disclaimer, the term of this patent is extended or adjusted under 35 U.S.C. 154(b) by 155 days.

(21) Appl. No.: 16/546,350

(22) Filed: Aug. 21, 2019

(65) Prior Publication Data

US 2019/0377337 A1  Dec. 12, 2019

Related U.S. Application Data

(63) Continuation of application No. 15/806,987, filed on Nov. 8, 2017, now Pat. No. 10,429,838.

(51) Int. Cl.
*G05D 1/00* (2006.01)
*B64C 39/02* (2006.01)
*G08G 5/00* (2006.01)

(52) U.S. Cl.
CPC ......... *G05D 1/0027* (2013.01); *B64C 39/024* (2013.01); *G08G 5/0043* (2013.01); *B64C 2201/024* (2013.01); *B64C 2201/14* (2013.01); *B64C 2201/146* (2013.01); *B64C 2201/18* (2013.01)

(58) Field of Classification Search
CPC ............... G05D 1/0027; B64C 39/024; B64C 2201/14; B64C 2201/18; B64C 2201/024; B64C 2201/146; G08G 5/0043
See application file for complete search history.

(56) References Cited

U.S. PATENT DOCUMENTS

| | | | |
|---|---|---|---|
| 8,314,730 B1* | 11/2012 | Musiak | G01S 13/953 342/25 B |
| 9,387,928 B1* | 7/2016 | Gentry | G08G 5/0052 |
| 9,701,408 B1* | 7/2017 | Willison | G08G 5/025 |
| 10,061,328 B2* | 8/2018 | Canoy | G08G 5/0056 |
| 2003/0001770 A1* | 1/2003 | Cornell | G01S 7/20 342/26 R |
| 2006/0155432 A1* | 7/2006 | Brown | H04L 67/12 701/14 |
| 2008/0033604 A1* | 2/2008 | Margolin | G05D 1/0027 701/2 |
| 2011/0130913 A1* | 6/2011 | Duggan | B64C 19/00 701/23 |

(Continued)

*Primary Examiner* — Russell Frejd
(74) *Attorney, Agent, or Firm* — The Small Patent Law Group LLC; Joseph M. Butscher

(57) ABSTRACT

A system for landing an unmanned aerial vehicle (UAV) at a destination includes a landing coordination control unit that is configured to switch the UAV from a normal operating mode to a landing mode in response to the UAV entering a regulated airspace in relation to the destination. The normal operating mode includes normal instructions for flying and navigating to the destination. The landing mode includes landing instructions for a landing sequence into a landing zone at the destination.

20 Claims, 4 Drawing Sheets

(56) References Cited

U.S. PATENT DOCUMENTS

| | | | | |
|---|---|---|---|---|
| 2011/0264314 A1* | 10/2011 | Parras | ............... | G05D 1/0676 |
| | | | | 701/16 |
| 2014/0081569 A1* | 3/2014 | Agrawal | ............ | G08G 5/0091 |
| | | | | 701/467 |
| 2015/0379408 A1* | 12/2015 | Kapoor | ................ | G01W 1/10 |
| | | | | 706/46 |
| 2016/0068264 A1* | 3/2016 | Ganesh | .............. | B64C 39/024 |
| | | | | 701/2 |
| 2016/0376031 A1* | 12/2016 | Michalski | .......... | G05D 1/0669 |
| | | | | 701/15 |
| 2017/0017240 A1* | 1/2017 | Sharma | .............. | G05D 1/0676 |
| 2017/0045894 A1* | 2/2017 | Canoy | ............... | G08G 5/0013 |
| 2017/0050748 A1* | 2/2017 | Byers | .................. | H04W 4/021 |
| 2017/0190423 A1* | 7/2017 | Salgueiro | ............... | B64F 1/12 |
| 2017/0285664 A1* | 10/2017 | Wang | ................... | B64D 45/00 |

* cited by examiner

UNMANNED AERIAL VEHICLE (UAV) LANDING SYSTEMS AND METHODS

RELATED APPLICATIONS

This application is a continuation of U.S. patent application Ser. No. 15/806,987, entitled "Unmanned Aerial Vehicle (UAV) Landing Systems and Methods," filed Nov. 8, 2017, now U.S. Pat. No. 10,429,838, which is hereby incorporated by reference in its entirety.

FIELD OF THE DISCLOSURE

Embodiments of the present disclosure generally relate to systems and methods for landing unmanned aerial vehicles (UAVs), and, more particularly, to systems and methods for automatically landing UAVs at a destination in an efficient and ordered manner.

BACKGROUND OF THE DISCLOSURE

UAVs (also known as aerial drones) are rapidly becoming accessible to businesses and individuals. For example, certain businesses may utilize UAVs to deliver products to customers. As another example, an individual may fly a UAV for recreational purposes.

Airspace at certain locations may be congested with a relatively high number of UAVs. Further, certain airspaces may be regulated for safety. For example, airspace around an airport, a professional sporting event, and/or the like may be regulated so as to restrict a number of UAVs therein.

Moreover, many UAVs may arrive at a particular location in the course of a day. For example, various business-related UAVs may arrive at a location at or proximate an airport, within a metropolitan area, and/or the like. As can be appreciated, numerous UAVs arriving at a particular location may cause the UAVs to interfere with one another or other vehicles (such as commercial aircraft) at or proximate to the location.

UAVs may not be allowed to fly proximate to or land at certain locations. Typically, in regions where UAVs are allowed to land, human intervention is required to land the UAVs. With increased use, UAVs may outnumber commercial aircraft within an airspace. As such, in the future, human-based management and control of UAV traffic may prove difficult, if not impossible.

SUMMARY OF THE DISCLOSURE

A need exists for a system and method of coordinating arrivals of UAVs at a particular location. Further, a need exists for a system and method for automatically and safely landing UAVs at a particular location.

With those needs in mind, certain embodiments of the present disclosure provide a system for landing an unmanned aerial vehicle (UAV) at a destination. The system includes a landing coordination control unit that is configured to switch the UAV from a normal operating mode to a landing mode in response to the UAV entering a regulated airspace in relation to the destination. The normal operating mode includes normal instructions for flying and navigating to the destination. The landing mode includes landing instructions for a landing sequence into a landing zone at the destination. The landing sequence may include one or more holding patterns.

The system may include a monitoring station that is separate and distinct from the UAV. The monitoring station may include the landing coordination control unit. The monitoring station may be at the destination. In at least one other embodiment, the UAV includes the landing coordination control unit.

In at least one embodiment, the landing coordination control unit is configured to overtake operational control of the UAV in the landing mode to automatically land the UAV at the landing zone. In at least one embodiment, the landing coordination control unit is configured to transmit the landing instructions to the UAV.

The landing instructions may be stored in an operational control unit of the UAV. The UAV may include a signal sensor that is configured to detect a signal from the landing coordination control unit.

Certain embodiments of the present disclosure provide a method for landing an unmanned aerial vehicle (UAV) at a destination. The method includes using a landing coordination control unit to switch the UAV from a normal operating mode to a landing mode in response to the UAV entering a regulated airspace in relation to the destination. The normal operating mode includes normal instructions for flying and navigating to the destination. The landing mode includes landing instructions for a landing sequence into a landing zone at the destination.

The method may include disposing the landing coordination control unit within a monitoring station that is separate and distinct from the UAV. Optionally, the method may include disposing the landing coordination control unit within the UAV.

Certain embodiments of the present disclosure provide a system for landing unmanned aerial vehicles (UAVs) at a destination. The system includes the plurality of UAVs that are to arrive at the destination. A landing coordination control unit is configured to switch the UAVs from a normal operating mode to a landing mode in response to the UAVs entering a regulated airspace in relation to the destination. The normal operating mode includes normal instructions for flying and navigating to the destination. The landing mode includes landing instructions for a landing sequence into a landing zone at the destination. The landing coordination control unit is configured to automatically provide an order of landing for the plurality of UAVs at the landing zone.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Embodiments of the present disclosure provide systems and methods that coordinate arrival of one or more unmanned aerial vehicles (UAVs) at fixed locations, and sequence landing of the UAVs at the fixed locations. Certain embodiments of the present disclosure provide unmanned aerial vehicle (UAV) landing systems and methods that are configured to control an approach and arrival of UAVs at a particular landing location, such as a designated UAV port. In at least one embodiment, the UAV landing systems and methods include a landing coordination control unit that is configured to switch the UAVs to a landing mode within a defined regulated airspace. For example, the UAVs may be switched to the landing mode as they enter a predefined distance to the landing location. The predefined distance may be 50 feet, 100 feet, 200 feet, or more, for example.

In at least one embodiment, the UAV begins a mission in a normal operating mode, in which the UAV flies and navigates towards a destination that includes the landing location in a known, usual manner. In the normal operating mode, the UAV operates and flies according to preprogrammed instructions that cause the UAV to fly and navigate to the destination. In response to the UAV entering regulated airspace above and around the landing location at the destination, the UAV switches to the landing mode. In the landing mode, the UAV may detect and receive landing instructions output by a landing coordination control unit. For example, the landing instructions may be sent via infrared signals, ultrasound signals, radio signals, and/or the like. The landing instructions may be altered depending on current weather and traffic conditions proximate to the destination. Alternatively, the UAV may be preprogrammed with the landing instructions, instead of receiving the landing instructions (or instead of detecting and receiving landing instructions).

Embodiments of the present disclosure provide UAV landing systems and methods that integrate UAVs safely into airspaces, while allowing flexibility and spontaneity for UAV missions. Embodiments of the present disclosure provide automatic UAV landing systems and methods, which do not require humans to control UAV traffic.

Figure 1:
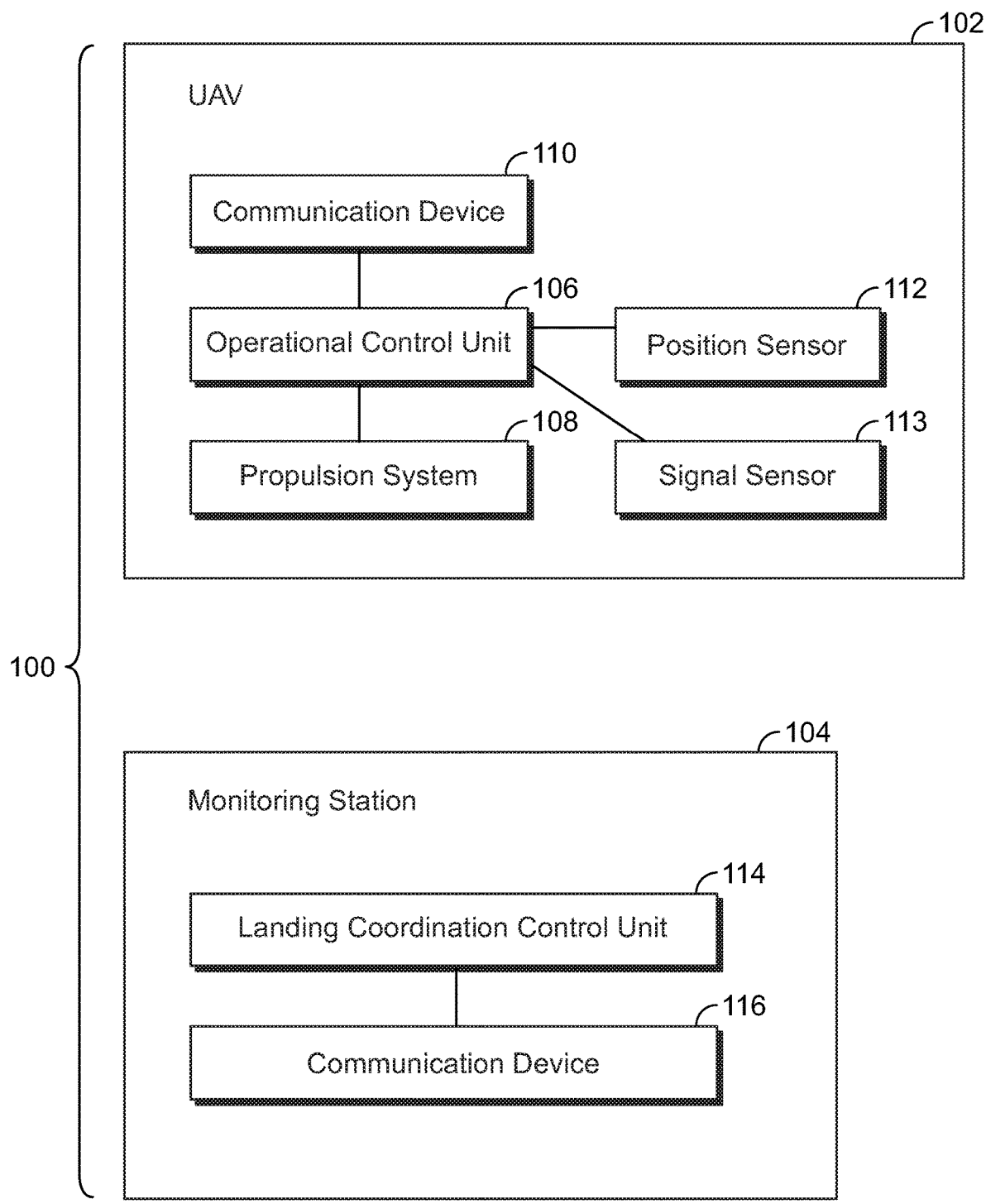
FIG. 1 is a box diagram of a UAV landing system, according to an exemplary embodiment of the present disclosure.

FIG. 1 is a box diagram of a UAV landing system 100, according to an exemplary embodiment of the present disclosure. The UAV landing system 100 includes a UAV 102 and a monitoring station 104. The monitoring station 104 may be at or proximate a particular location at which the UAV 102 is to land. The monitoring station 104 is configured to communicate with the UAV 102, such as through infrared, laser, ultrasound, radio, and/or other such wireless signals.

The UAV 102 includes an operational control unit 106 that is operatively coupled to a propulsion system 108, a communication device 110, and a position sensor 112, such as through one or more wired or wireless connections. The propulsion system 108 may include one or more turbofan engines, one or more propellers, one or more rotors (such as used with helicopters), and/or the like. The communication device 110 may be an antenna, transceiver, radio, camera, and/or the like that is configured to receive and transmit wireless communication signals. The position sensor 112 may be a navigational device, such as a global positioning system (GPS) device, that is configured to detect and determine a position of the UAV in relation to a destination, for example.

The monitoring station 104 may be a land-based station at or proximate to the destination. Optionally, the monitoring station 104 may be remotely located from the destination. As another example, the monitoring station 104 may be onboard an aircraft, watercraft, spacecraft, or the like. In at least one embodiment, the monitoring station 104 may be onboard a geosynchronous satellite.

The monitoring station 104 includes a landing coordination control unit 114 operatively coupled to a communication device 116, such as an antenna, transceiver, radio, camera, and/or the like that is configured to receive and transmit wireless communication signals. For example, the landing coordination control unit 114 may transmit landing instructions to the UAV 102 through the communication device 116. The UAV 102 and the monitoring station 104 communicate with one another through the respective communication devices 110 and 116. Optionally, the landing coordination control unit 114 may be onboard the UAV 102, instead of within the monitoring station 104.

In operation, the UAV 102 departs from a departure location towards a destination according to a normal operating mode, instructions for which may be stored within a memory of the operational control unit 106 (and/or a memory coupled to the operational control unit 106). The normal operating mode includes normal instructions for flying and navigating to the destination. For example, in the normal operation mode, the UAV 102 flies and navigates towards the destination according to a flight plan.

As the UAV 102 enters a regulated airspace in relation to the destination, the UAV 102 switches form the normal operating mode to a landing mode. The landing mode includes landing instructions for a landing sequence into a landing zone at the destination. For example, as the UAV 102 enters the regulated airspace (such as determined by the position of the UAV 102 as detected by the position sensor 112), the landing coordination control unit 114 may output a landing mode signal to the UAV 102. The UAV 102 receives the landing mode signal from the monitoring station 104. The operational control unit 106 receives the landing mode signal, and switches the UAV 102 to the landing mode.

In at least one embodiment, the landing mode signal output from the monitoring station includes instructions for a landing sequence. In at least one other embodiment, the operational control unit 106 is preprogrammed with the instructions for the landing sequence, and the landing mode signal from the monitoring station simply causes the operational control unit 106 of the UAV 102 to switch from the normal operating mode to the landing mode. In at least one other embodiment, when the operational control unit 106 switches to the landing mode, the landing coordination control unit 114 overtakes operational control of the UAV 102 to automatically land the UAV 102 at the destination.

The landing sequence provides a coordinated, controlled landing of the UAV 102. For example, the landing sequence may cause the UAV 102 to initiate a holding pattern at a particular altitude (such as 100 feet) for a predetermined time (such as 30 seconds), after which the UAV may descend to a lower altitude (such as 50 feet) for a predetermined time (such as 20 seconds), before an approach and landing at a landing zone at the destination. The landing sequence may include additional, less, and/or different holding patterns (or no holding patterns) for longer or shorter periods than indicated. It is to be understood that the landing sequence noted is merely a non-limiting example.

Further, a landing sequence may differ for different UAVs 102 based on UAV traffic in relation to a destination. For example, if numerous UAVs 102 are proximate to the destination, the landing sequence for each UAV 102 may include different holding patterns. As another example, if a relatively low number of UAVs 102 are proximate to the destination, the landing sequence may not include any holding patterns, but may simply include a direct approach and landing procedure.

Figure 2:
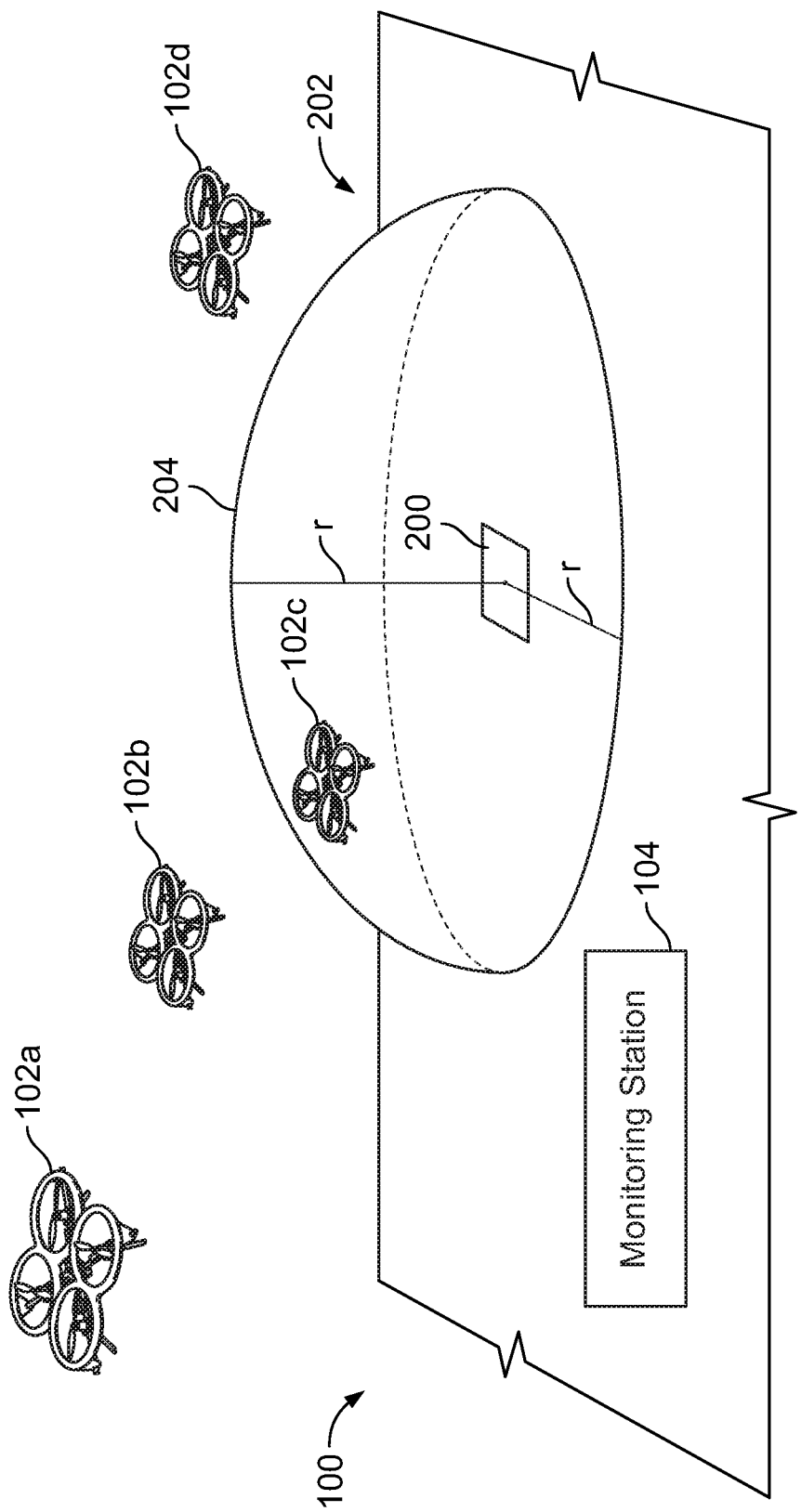
FIG. 2 is a schematic diagram of a UAV landing system that is configured to coordinate arrival and landing of UAVs at a landing zone at a destination, according to an exemplary embodiment of the present disclosure.

FIG. 2 is a schematic diagram of the UAV landing system 100 that is configured to coordinate arrival and landing of UAVs 102a, 102b, 102c, and 102d at a landing zone 200 at a destination 202, according to an exemplary embodiment of the present disclosure. As shown, the UAVs 102a, 102b, 102c, and 102d are proximate to the destination 202, and are to land at the landing zone 200. More or less UAVs than shown may be proximate to the destination 202.

A regulated airspace 204 is defined at the destination 202 above and around the landing zone 200. The regulated airspace 204 may be a hemispherical volume of space. For example, the regulated airspace 204 may be defined by a radial distance r from a center of the landing zone 200. The radial distance r may be 200 feet, for example. It is to be understood that 200 feet is merely a non-limiting example. The radial distance r may optionally be greater or less than 200 feet (such as 1 mile or 50 feet). Also, optionally, the regulated airspace 204 may be shaped other than a hemisphere. For example, the regulated airspace 204 may be cylindrical or conical.

Referring to FIGS. 1 and 2, the UAVs 102a, 102b, 102c, and 102 fly towards the destination 202 according to normal operating modes outside of the regulated airspace 204. As the UAVs 102a, 102b, 102c, and 102d enter the regulated airspace 204 (such as the UAV 102c shown in FIG. 1), the UAVs 102a, 102b, 102c, and 102d switch to the landing modes. As described above, the monitoring station 104 may output the landing mode signal to the UAVs 102a, 102b, 102c, and 102d upon entry into the regulated airspace 204. The landing coordination control unit 114 automatically coordinates the landing of the UAVs 102a, 102b, 102c, and 102d at the landing zone 200, such as based on the order at which the UAVs 102a, 102b, 102c, and 102d enter the regulated airspace 204. In at least one embodiment, the position sensors 112 determine the locations of the UAVs 102a, 102b, 102c, and 102d. The landing coordination control unit 114 receives the communicated position signals of the UAVs 102a, 102b, 102c, and 102d. In at least one other embodiment, the monitoring station 104 may track positions of the UAVs 102a, 102b, 102c, and 102d through separate tracking systems, such as radar, satellite tracking, ADS-B, and/or the like.

As shown, the UAV 102c is within the regulated airspace 204. As such, the UAV 102c is the first to switch to the landing mode, and therefore may be the first to land at the landing zone 200. The order of landing may be based on the time each of the UAVs 102a, 102b, 102c, and 102d enters the regulated airspace 204. Optionally, the landing coordination control unit 114 may coordinate the landing of the UAVs 102a, 102b, 102c, and 102d based on additional factors, such as overall time of flight, capabilities of the UAVs 102a, 102b, 102c, and 102d (for example, remaining power, remaining fuel, etc.), weather conditions, age of the UAVs 102a, 102b, 102c, and 102d, and/or the like. For example, the landing coordination control unit 114 may reorder a landing queue based on whether one of the UAVs 102a, 102b, 102c, and 102d has been flying longer than the others. In this manner, a UAV 102 that enters the regulated airspace 204 after other UAVs 102 may land before the other UAVs 102. As another example, the landing coordination control unit 114 may arbitrate a landing order for multiple UAVs 102 that enter the regulated airspace 204 at the same time, such as based on times of flight, relative sizes of the UAVs, departure points, and/or the like.

As shown in FIGS. 1 and 2, the landing coordination control unit 114 may be housed within the monitoring station 104. Optionally, one or more of the UAVs 102a, 102b, 102c, and 102d may include the landing coordination control unit 114. For example, an operational control unit 106 of at least one of the UAVs 102a, 102b, 102c, and 102d may include a landing coordination control unit 114 (or, the landing coordination control unit 114 may be operatively coupled to the operational control unit 106). In at least one embodiment, each of the UAVs 102a, 102b 102c, and 102d may include a separate landing coordination control unit 114. As such, the UAV landing system 100 may not include the separate and distinct monitoring station 104. Instead, the landing coordination control unit 114 may be onboard at least one UAV 102a, 102b, 102c, and 102d, and the UAVs 102a, 102b, 102c, and 102d may communicate among themselves to coordinate landing of each of the UAVs 102a, 102b, 102c, and 102d.

As described herein, the UAVs 102 operate according to a normal operation mode outside of the regulated airspace 204 to fly and navigate towards the destination 202. In response to the UAVs 102 entering the regulated airspace 204, the UAVs 102 switch to the landing mode. The UAVs 102 may have instructions for a landing sequence stored within a memory, and/or may receive instructions for the landing sequence from the landing coordination control unit 114. The UAVs 102 follow the instructions for the landing sequence to automatically land at the landing zone 200.

In at least one embodiment, the landing coordination control unit 114 overtakes operational control of the UAVs 102 in the landing mode to automatically land them at the landing zone 200. For example, the instructions for the landing sequence may be stored within a memory of the landing coordination control unit 114, and, instead of merely communicating the instructions to the UAV 102, the landing coordination control unit 114 may control the UAVs 102 in the landing mode according to the instructions.

The landing coordination control unit 114 provides instructions that define one or more procedures for arrival and landing of the UAVs 102. The instructions are automatically output and/or otherwise followed in response to the UAVs 102 entering the regulated airspace 204 (such as upon the UAVs 102 reaching a predetermined distance to the landing zone 200). Each procedure assigned to a UAV 102 may be adapted for the performance of a particular UAV 102 (such as current speed, distance, angular position, and/or the like).

Referring again to FIG. 1, in at least one embodiment, the UAV 102 may include a signal sensor 113 (such as an ultrasound, infrared, laser, or other such sensor), which may be configured to detect corresponding signals output by the monitoring station 104. For example, when the UAV 102 enters the regulated airspace 204, the UAV 102 switches to the landing mode, and activates the signal sensor 113 to scan for and detect signals output by the monitoring station 104. Until the UAV 102 receives the signals output by the monitoring station 104, the UAV 102 may be in a holding pattern. The signal(s) output by the monitoring station 104 may include the instructions for a landing sequence. In response to the UAV 102 receiving the signal(s) from the monitoring station 104, the UAV 102 may then initiate a landing sequence based on the received instructions. Optionally, the UAV 102 may not include the signal sensor 113, but instead may be in communication with the landing coordination control unit 114 as described herein.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the operational control unit 106 and the landing coordination control unit 114 may be or include one or more processors that are configured to control operation of the UAV 102s, as described herein.

The operational control unit 106 and the landing coordination control unit 114 are configured to execute a set of instructions that are stored in one or more data storage units or elements (such as one or more memories), in order to process data. For example, the operational control unit 106 and the landing coordination control unit 114 may include or be coupled to one or more memories. The data storage units may also store data or other information as desired or needed. The data storage units may be in the form of an information source or a physical memory element within a processing machine.

The set of instructions may include various commands that instruct the operational control unit 106 and the landing coordination control unit 114 as processing machines to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the operational control unit 106 and the landing coordination control unit 114. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the operational control unit 106 and the landing coordination control unit 114 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 3:
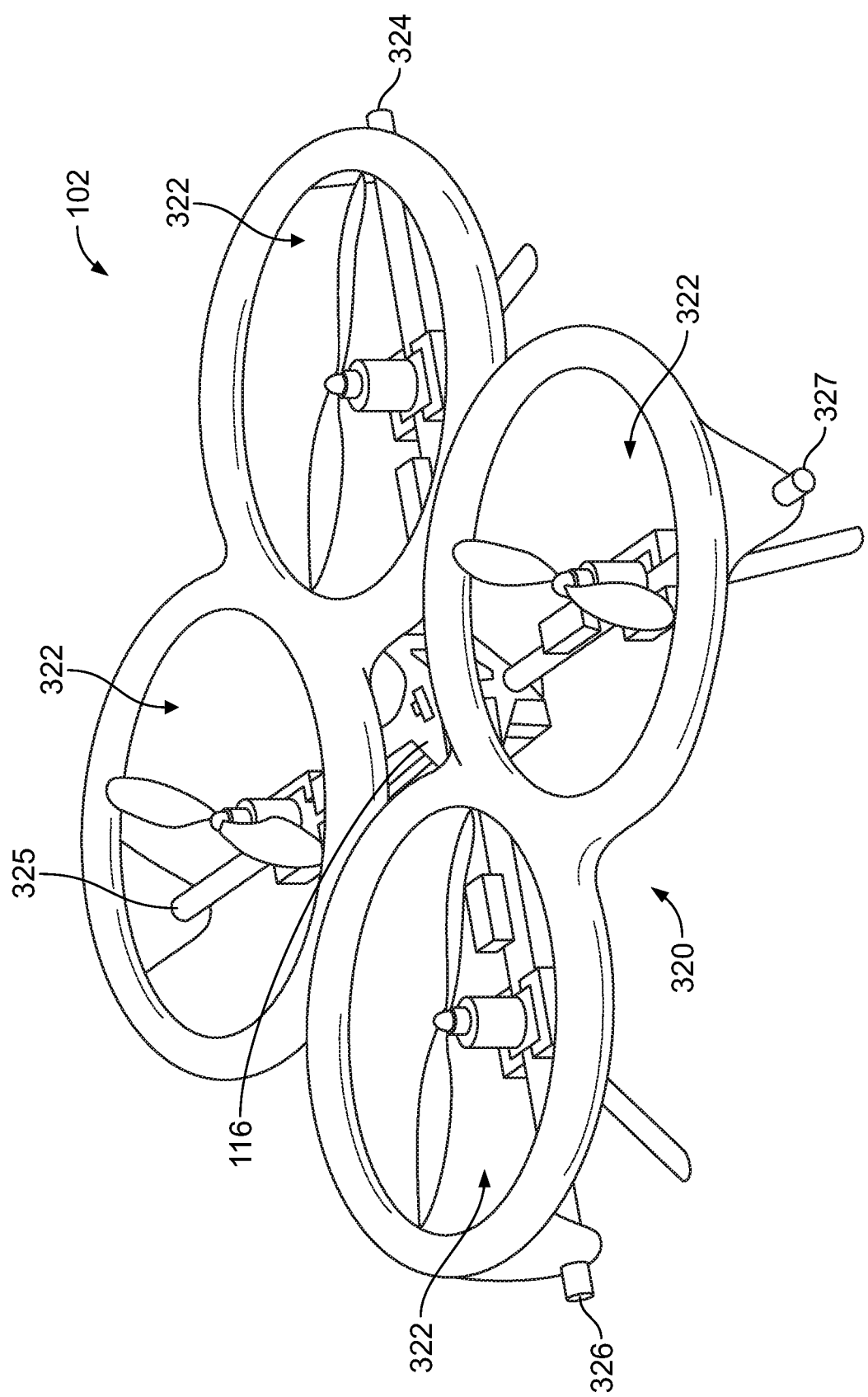
FIG. 3 is a diagrammatic representation of a top view of a UAV, according to an exemplary embodiment of the present disclosure.

FIG. 3 is a diagrammatic representation of a top view of a UAV 102, according to an exemplary embodiment of the present disclosure. The UAV 102 may include an airframe 320 and a plurality of propulsion systems 322 coupled to the airframe 320. In general, the airframe 320 forms the structural body or framework for the UAV 102. In the illustrated embodiment shown in FIG. 3, the UAV 102 includes four propulsion systems 322, such that each propulsion system 322 is mounted to a respective arm 324, 325, 326, and 327. In the illustrated embodiment, the UAV 102 includes four arms 324-327 and a single propulsion system 322 that is mounted to each respective arm 324-327. Optionally, the UAV 102 may include more or less propulsion systems 322, more or less propulsion systems 322 per arm 324-327, and more or less arms 324-327 than shown.

The UAV 102 shown in FIG. 3 is merely one example of a UAV 102. The UAV 102 may optionally be a fixed wing plane with various other types of propulsion systems. For example, the UAV 102 may be an unmanned plane having one or more propellers, jet engines, and/or the like.

Figure 4:
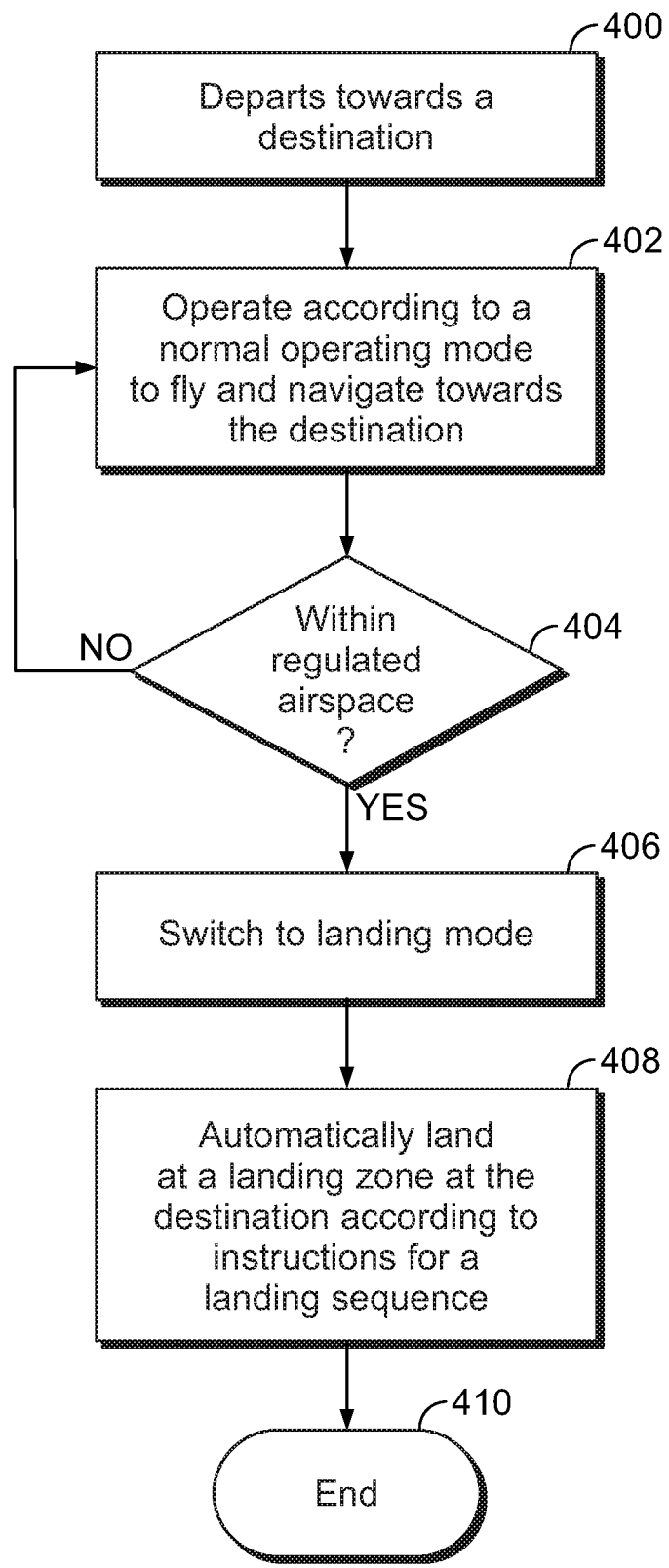
FIG. 4 illustrates a flow chart of a UAV landing method, according to an exemplary embodiment of the present disclosure.

FIG. 4 illustrates a flow chart of a UAV landing method, according to an exemplary embodiment of the present disclosure. Referring to FIGS. 1, 2, and 4, the method begins at 400, at which a UAV 102 departs from a starting location towards the destination 202. At 402, the UAV 102 operates according to the normal operating mode to fly and navigate towards the destination 202.

At 404, the landing coordination control unit 114 (whether within the monitoring station 104 or onboard the UAV 102) determines whether the UAV 102 is within the regulated airspace 204 over and around the landing zone 200 at the destination 202. If the UAV 102 is not within the regulated airspace 204, the method returns to 402.

If, however, the UAV 102 is within the regulated airspace 204, the method proceeds from 404 to 406, at which the UAV 102 switches to the landing mode. In the landing mode, the UAV 102 may receive instructions for a landing sequence from the landing coordination control unit 114. For example, the landing coordination control unit 114 of the monitoring station 104 may transmit the landing instructions to the UAV 102.

At 408, the UAV 102 then automatically lands (without human intervention) at the landing zone 200 at the destination 202 according to the instruction for the landing sequence. The method then ends at 410.

As described herein, embodiments of the present disclosure provide UAV landing systems and methods that do not require human intervention. The UAV landing systems and methods automatically, efficiently, and safely coordinate arrivals of UAVs at a particular destination.

Embodiments of the present disclosure provide systems and methods that allow large amounts of data to be quickly and efficiently analyzed by a computing device. For example, hundreds if not thousands of UAVs may attempt to land at a destination during the course of a day. The number of UAVs may exceed the number of commercial aircraft within an airspace during that time. The vast amounts of data are efficiently analyzed by the landing coordination control unit 114, as described herein. The UAV landing systems and methods analyze data regarding the UAVs in a relatively short time. A human being (such as an air traffic controller already preoccupied with commercial aircraft) may be incapable of analyzing such vast amounts of data in such a short time. As such, embodiments of the present disclosure provide superior performance in relation to a human being analyzing the vast amounts of data. In short, embodiments of the present disclosure provide systems and methods that analyze thousands, if not millions, of calculations and computations that a human being is incapable of efficiently, effectively and accurately managing.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for landing an unmanned aerial vehicle (UAV) at a destination, the system comprising:
   a landing coordination control unit that is configured to switch the UAV from a normal operating mode to a landing mode in response to the UAV entering a regulated airspace in relation to the destination.

2. The system of claim 1, further comprising a monitoring station that is separate and distinct from the UAV, wherein the monitoring station includes the landing coordination control unit.

3. The system of claim 2, wherein the monitoring station is at the destination.

4. The system of claim 1, further comprising the UAV, wherein the UAV includes the landing coordination control unit.

5. The system of claim 1, wherein the landing sequence comprises one or more holding patterns.

6. The system of claim 1, wherein the landing coordination control unit is configured to overtake operational control of the UAV in the landing mode to automatically land the UAV at the landing zone.

7. The system of claim 1, wherein the landing coordination control unit is configured to transmit landing instructions to the UAV.

8. The system of claim 1, wherein landing instructions are stored in an operational control unit of the UAV.

9. The system of claim 1, wherein the UAV comprises a signal sensor that is configured to detect a signal from the landing coordination control unit.

10. A system for landing a plurality of unmanned aerial vehicles (UAVs) at a destination, the system comprising:
    a landing coordination control unit that is configured to:
      switch the UAVs from a first mode to a second mode in response to the UAVs entering a regulated airspace, and
      automatically determine and provide an order of landing for the plurality of UAVs at the destination.

11. The system of claim 10, further comprising a monitoring station that is separate and distinct from the plurality of UAVs, wherein the monitoring station includes the landing coordination control unit.

12. The system of claim 11, wherein the monitoring station is at the destination.

13. The system of claim 10, further comprising the plurality of UAVs, wherein one of the plurality of UAVs includes the landing coordination control unit.

14. The system of claim 10, wherein a landing sequence for the plurality of UAVs comprises one or more holding patterns.

15. The system of claim 10, wherein the first mode is a normal operating mode, and the second mode is a landing mode, wherein the landing coordination control unit is configured to overtake operational control of the plurality of UAVs in the landing mode to automatically land the UAVs at a landing zone of the destination.

16. The system of claim 10, wherein the landing coordination control unit is configured to transmit landing instructions to the plurality of UAVs.

17. The system of claim 16, wherein the landing instructions are stored in an operational control unit of at least one of the plurality of UAVs.

18. The system of claim 10, wherein the plurality of UAVs comprises a signal sensor that is configured to detect a signal from the landing coordination control unit.

19. A system for landing a plurality of unmanned aerial vehicles (UAVs) at a destination, the system comprising:
   a landing coordination control unit that is configured to switch the plurality of UAVs from a normal operating mode to a landing mode in response to the plurality of UAVs entering a regulated airspace in relation to the destination, and
   wherein the landing coordination control unit is configured to automatically provide an order of landing for the plurality of UAVs at the destination.

20. The system of claim 19, further comprising a monitoring station that is separate and distinct from the plurality of UAVs, wherein the monitoring station includes the landing coordination control unit.

\* \* \* \* \*